C. H. QUINN.
ELECTRIC GENERATOR SUPPORT.
APPLICATION FILED OCT. 29, 1917.
1,318,406.
Patented Oct. 14, 1919.
2 SHEETS—SHEET 2.
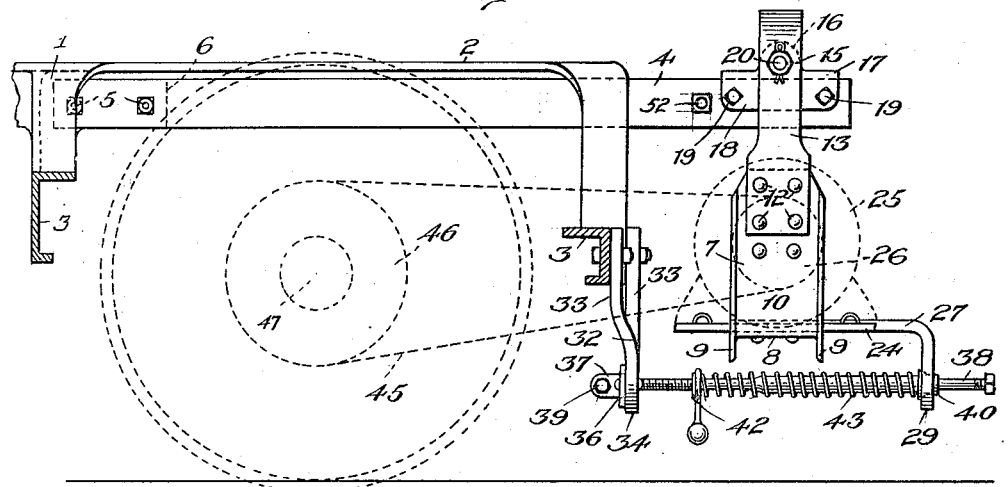
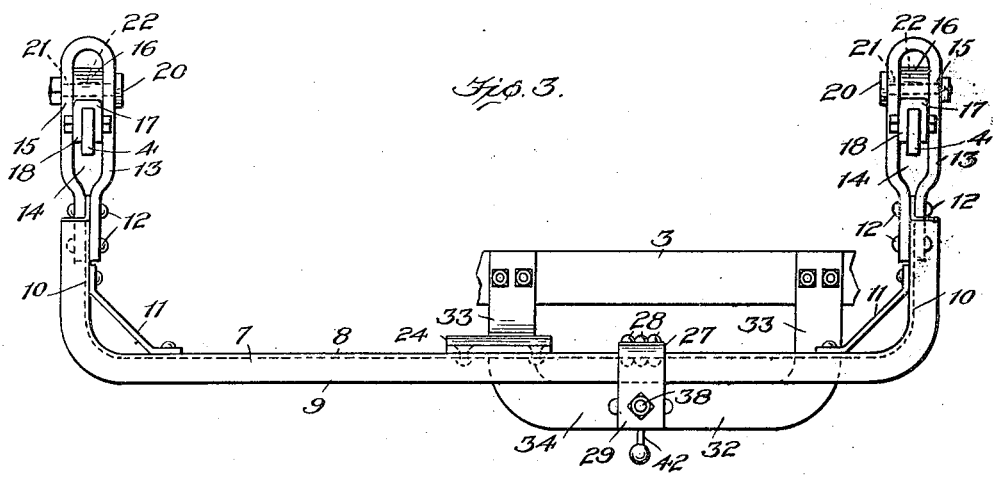
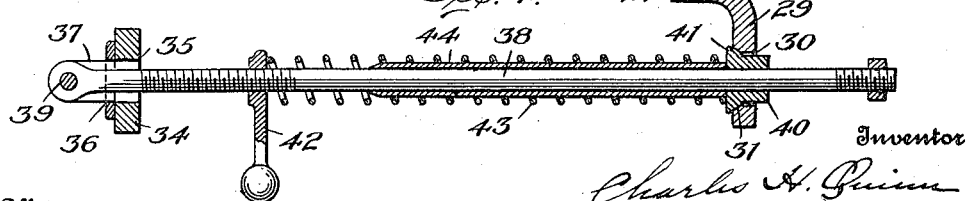

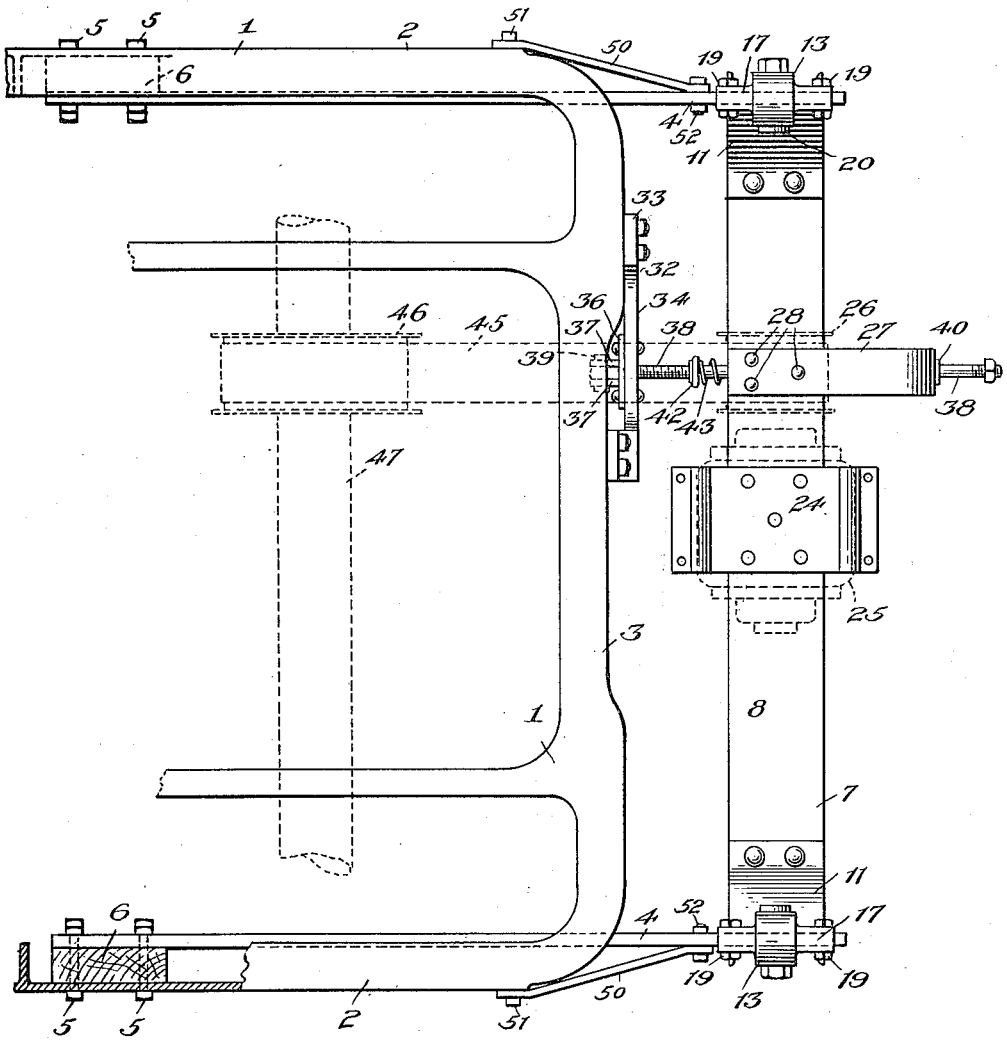

UNITED STATES PATENT OFFICE.

CHARLES H. QUINN, OF ROANOKE, VIRGINIA.

ELECTRIC-GENERATOR SUPPORT.

1,318,406.  Specification of Letters Patent.  Patented Oct. 14, 1919.

Application filed October 29, 1917. Serial No. 199,141.

*To all whom it may concern:*

Be it known that I, CHARLES H. QUINN, a citizen of the United States, residing at Roanoke, in the county of Roanoke and State of Virginia, have invented certain new and useful Improvements in Electric-Generator Supports; and I do hereby declare the following to be a full, clear, and exact description of the invention, such as will enable others skilled in the art to which it appertains to make and use the same.

The invention relates to means for suspending car axle driven dynamos from the car trucks, and more particularly to that type of supporting devices in which a frame is pivotally suspended from the car truck. The principal object of my invention, generally stated, is to provide a pivoted dynamo support of simple design having but a pair of wearing points and so connected to the truck frame as to be held thereon against all possible chance of disengagement. There are many other novel features relating to structure and mode of application and connection which will more fully appear from the detailed description of the device when taken in connection with the accompanying drawings which have been chosen for the purpose of illustrating a single embodiment of my invention, and in which—

Figure 1 is a top plan view of a portion of a car truck showing the invention applied thereto, Fig. 2 is a view partially in section and partially in side elevation of the structure shown in Fig. 1, Fig. 3 is an end elevation of the structure shown in Fig. 1, portions of the truck being omitted for the sake of clearness, and Fig. 4 is a fragmentary detail showing a spring tensioning device.

Throughout the specification and drawings like parts are designated by like reference characters.

The numeral 1 designates the frame of the car truck provided with side members 2 and a cross or end member 3, only one of the latter being illustrated. A pair of suspension bars 4 are connected to the side members 2 by means of bolts 5, 5. A block 6 may be interposed between each suspension bar and the adjacent side frame member so as to space the bars inwardly of the side frame members 2, if desired. The suspension bars 4 are for convenience formed as rectangular bars or plates and as illustrated are adapted to extend a short distance beyond the end member 3 of the truck frame. Braces 50 are provided for stiffening the outer ends of the bars 4 against lateral bending these being bolted to the frame 1 by means of the bolts 51 and to the bars 4 by means of the bolts 52.

The electric generator or dynamo supporting frame or cradle 7 preferably comprises a channel bar 8, the flanges 9 thereof extending downwardly. This bar 8 is provided with upwardly extending legs 10, which may conveniently be formed by bending the ends of the channel 8 substantially at right angles to the main body of said bar. In order to counteract any tendency of the bar 8 to deform at the ends, I preferably provide a stiffening member 11, in the form of a plate at each corner, these stiffening members being rigidly riveted at opposite ends to the web of the channel bar on opposite sides of the bend or angle. To the upwardly extending ends 10 of the bar 8 are rigidly connected, preferably by means of rivets 12, hangers or yokes 13 which may comprise wrought iron bars bent to form an eye or loop 14, the free ends of the loop being adapted to extend on opposite sides of the web of the bar 8 and through these free ends and the intervening web are adapted to extend the connecting rivets 12 which rigidly tie these parts together. Each of the hangers 13 is provided adjacent its upper end 15 with a pivot member adapted to coöperate with the pivot member 16 which is formed on the pivot brackets 17. Each pivot bracket 17 preferably comprises a saddle or bifurcated plate 18 which is adapted to straddle the outwardly projecting end of one of the suspension bars 4 to which the bracket 17 is adjustably connected, as will be hereafter more fully set forth, by means of the bolts 19. The form of pivotal connection between each bracket 17 and the adjacent hanger 13 may, and preferably does comprise a bolt 20 which is adapted to extend through alined openings 21 and 22 in the hangers 13 and brackets 17, respectively.

As will be clearly seen from the disclosure, particularly Figs. 2 and 3, the opening 14 in the hangers 13 while of sufficient width to allow the brackets 17 to be inserted within the loop of the hanger 13 is, however, of less width than the length of the bolts 19 which connect the brackets to the suspension rods 4. It will be evident that after the hangers and brackets are pivotally connected by means of the bolts 20, that the securing bolts 19 will prevent the accidental disengagement of the hangers and brackets should either bolt 20 break.

Intermediate the ends of the channel 8, and on the upper side thereof, is rigidly connected a plate 24 to receive the dynamo or electric generator 25, which is diagrammatically illustrated by dotted lines, and between the plate 24 and one end of the bar 8 and in the same plane with the pulley 26 of the generator 25 is the tension spring seat 27. This spring seat 27 preferably comprises an angled or substantially L-shaped plate rigidly connected to the channel 8 by means of the rivets 28. In the downturned end 29 of the plate 27 there is provided an opening 30, the inner or truck-adjacent end of which is enlarged to form a conical bearing 31. To the cross member 3 of the truck frame, is connected the tension rod yoke 32 which preferably comprises a substantially U-shaped member, the legs 33 of which are rigidly bolted to the cross member 3. The bottom member 34 of the said yoke is provided with an opening 35 and a bracket 36 is connected to the inner face of the said bottom member 34 adjacent the opening 35, the said bracket being provided with a pair of perforated lugs or ears 37.

The tension rod 38 is adapted to extend through the alined openings 35 in the yoke 32 and the opening 30 in the spring seat plate 27, the inner end of the rod being connected to the bracket 36 by means of the bolt 39. The outer end of the rod 38 passes through a bushing 40 which is mounted in the opening 30, the said bushing having a conical head 41 adapted to seat in and coöperate with the conical bearing 31. Interposed between the bushing 40 and the weighted adjusting nut 42, which is threadably mounted on the tension rod adjacent the yoke 32, is the tension spring 43 and the sliding sleeve 44.

The device is connected to the truck by first connecting the bars 4 to the side frames 2. The entire cradle 7 is then connected to the pivotal brackets 17, after which brackets 17 are slidably mounted on the projecting ends of the rods 4. The cradle is then adjusted in parallelism with the car axle and holes are bored through the bars 4 to aline with the openings in the brackets 17 and through these alined openings are inserted the bolts 19. This method of connection permits of the ready adjustment of the cradle to meet all the requirements of service.

The pulley 26 of the generator 25 is operatively connected to the pulley 46 which is mounted on the car axle 47 by means of the belt 45. It will be seen on an inspection of Fig. 1 that the spring tensioning device is located in the vertical plane of the pulleys 26 and 46. By so locating the tensioning device in line with the belt center, I avoid all eccentric or twisting movement in the suspension frame or cradle and by locating the tensioning device between the truck frame and the downturned end of the plate 27 I shorten the over-all length of the device and protect the tensioning device from accidental breakage.

Having now described my device, although it is to be understood that the terms employed are used in their descriptive and not in their limiting sense, what I claim and desire to secure by Letters Patent is:

1. In a car truck, the combination with a pair of supporting bars, of a cradle pivotally connected thereto, said cradle forming the support for an electric generator, means for operatively connecting the generator to the car axle, and means interposed between said truck and cradle and below the latter and in vertical alinement with said generator connecting means for maintaining the latter under tension.

2. In a car truck, the combination with a pair of bars connected to the said truck, of a support for an electric generator, means for operatively connecting the generator to the car axle, means for pivotally connecting said support and said bars said means comprising a pair of members each adapted to embrace a portion of one of the said bars and rigidly connected to the said support, a bracket mounted on each of said bars and pivotally connected to the adjacent member, and means for rigidly connecting the said brackets to the said bars, said last named means serving to prevent accidental disengagement of the said members.

3. In a car truck, the combination with a pair of supporting bars, of an electric generator support pivotally connected to the said bars, means for operatively connecting the generator to the car axle, a plate rigidly connected to the said generator support and a spring tensioning device interposed between the car truck and the said plate, said tensioning device being below said generator and in vertical alinement with the generator connecting means.

In testimony whereof I affix my signature.

CHARLES H. QUINN.

Copies of this patent may be obtained for five cents each, by addressing the "Commissioner of Patents, Washington, D. C."